April 19, 1932.    F. W. SPERR, JR    1,854,492
FLUID CONTACT APPARATUS
Filed July 15, 1926    3 Sheets-Sheet 1
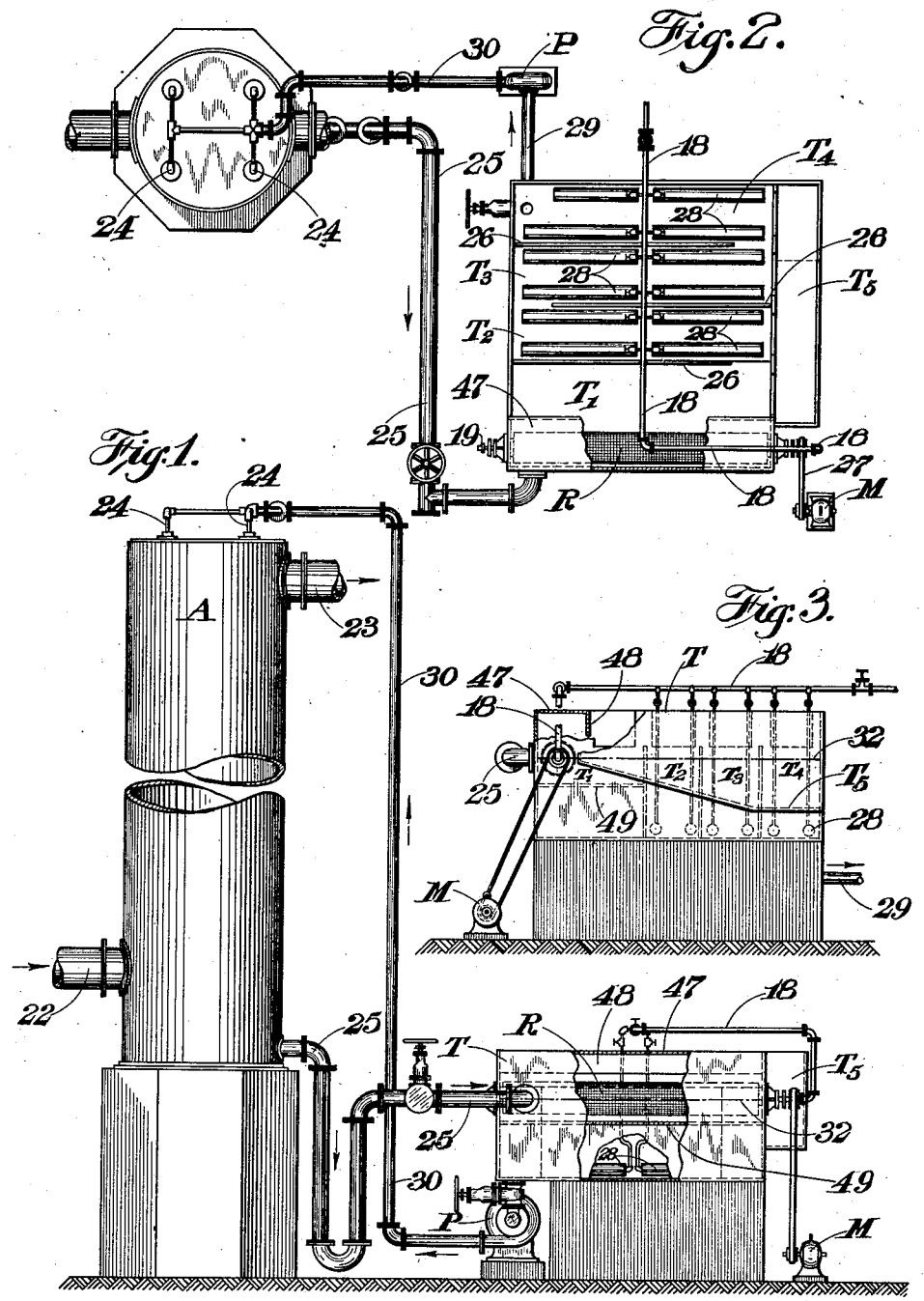

April 19, 1932.  F. W. SPERR, JR  1,854,492
FLUID CONTACT APPARATUS
Filed July 15, 1926  3 Sheets-Sheet 2
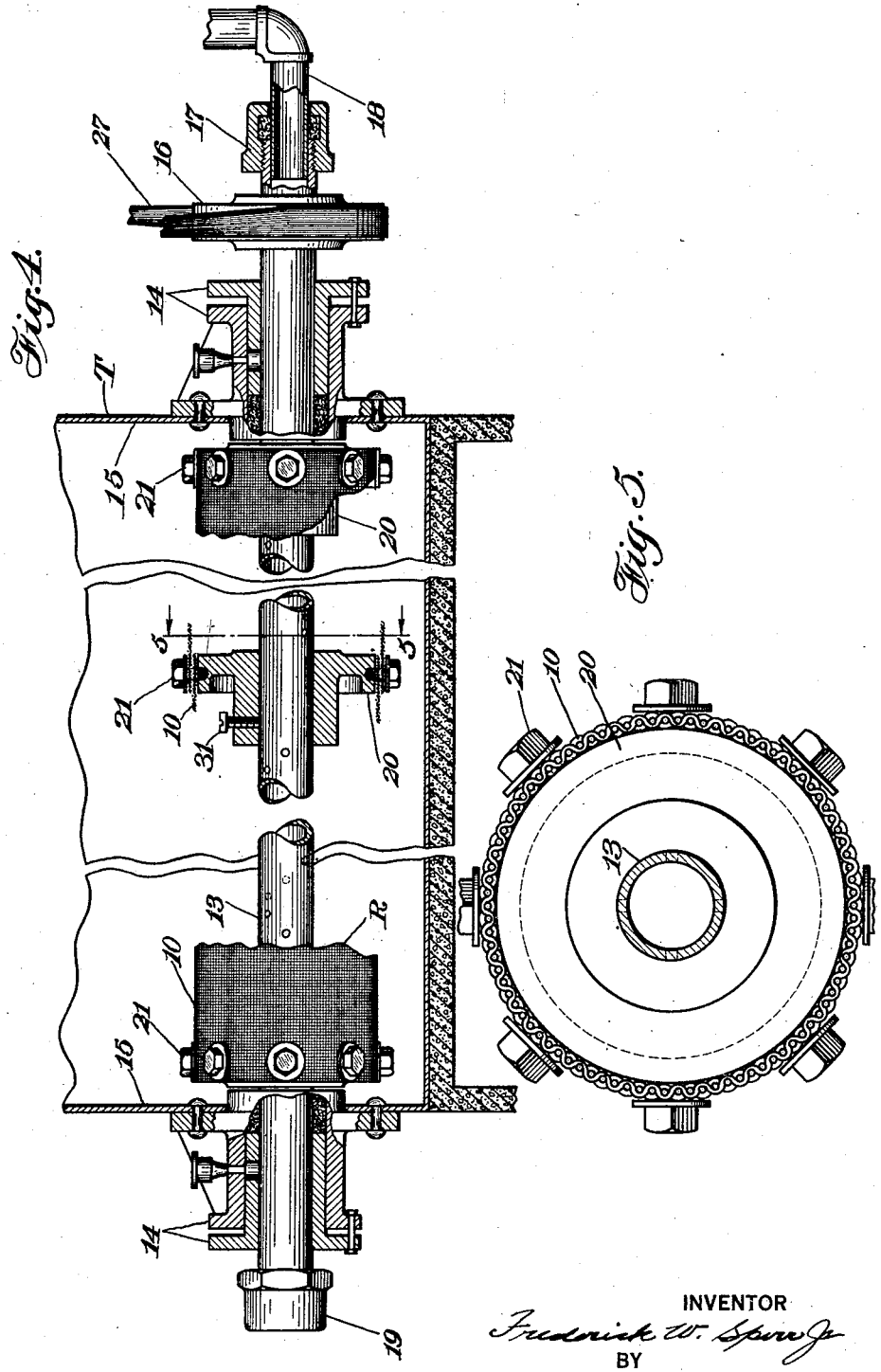
INVENTOR
Frederick W. Sperr Jr
BY
Munday Clarke & Carpenter
ATTORNEYS April 19, 1932.   F. W. SPERR, JR   1,854,492
FLUID CONTACT APPARATUS
Filed July 15, 1926   3 Sheets-Sheet 3

Patented Apr. 19, 1932

1,854,492

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

FLUID CONTACT APPARATUS

Application filed July 15, 1926. Serial No. 122,652.

My invention relates in general to improvements in fluid contact apparatus, and more particularly to apparatus for obtaining exceedingly intimate contact between a gas and a liquid, or between two liquids.

Objects of this invention are to obtain a high efficiency of contact between such gas or liquid, and an absorbent liquid, with elimination of stoppages that have heretofore resulted, and such other advantages or results in construction or operation as may be found to obtain in the apparatus hereinafter described or claimed.

With respect to contact between a gas and a liquid, the invention has an important application in the regeneration of gas purification liquids, more particularly such liquids as are employed in processes described and claimed in my prior copending applications Serial No. 520,807, filed Dec. 8, 1921; Serial No. 21,979, filed April 9, 1925; and Serial No. 21,983, filed Apr. 9, 1925 and my issued Patent No. 1,578,560, granted May 30, 1926.

Broadly stated, such processes comprise the purification of fuel gases from hydrogen sulphide by subjecting the said gases to contact with an alkaline liquid-absorbing medium, wherein is suspended a finely divided compound of iron. A solution that has given excellent results in practice comprises a 0.5 per cent suspension of ferric oxide in a 2.0 per cent solution of sodium carbonate. The solution absorbs the hydrogen sulphide from the flowing gas on contact with the same, and is later subjected to aeration out of contact with the gas, whereby the sulphides present are oxidized to the original or active compounds, with separation of free sulphur. The sulphur is removed from the liquid, and the revivified solution is returned to the absorption apparatus, where it is used once more to remove the impurities from gas. The process thus comprises a cycle of operation that includes an absorption phase and an actification phase.

It has been the practice to pump the solution, immediately after contact with the gas, into an aerating chamber, called a thionizer, that is equipped with a plurality of porous aerators of cloth or ceramic material, of tubular or flat configuration, whereby air in finely comminuted form is forced into the solution-suspension.

By reason of the higher efficiency of finely comminuted air obtainable with porous media, it has been possible to oxidize these sulphides with a smaller quantity of air than has heretofore been possible.

Porous blocks or other rigid porous media, due to the fineness of the orifices therein have, however, sometimes been found to be subject to some stoppages after a period of use which have lessened efficiency in operation. An improvement over such media consists in the vibratile fabric aerator described and claimed in copending application of G. E. Seil, Serial No. 21,978, filed April 9, 1925. However, even in the use of such vibratile aerators, it has sometimes been found that occasionally some stoppages have occurred after an extended period of use. Practically all of such stoppages have been found to occur in the first tubes encountered by the solution entering the thionizer. It has been demonstrated that, by replacing the first tubes with open perforated air pipes, such stoppages can be eliminated, but only at a serious loss of efficiency, because the air issuing from such pipes is not finely comminuted air.

The present invention provides means for aeration of gas purification liquids by a novel means for mechanical integration or a novel combination of diffusion and mechanical integration, and includes a mechanical aerator rotating at comparatively low speed. Said mechanical aerator is comprised of a horizontally disposed relatively coarsely foraminated cylinder rotatably mounted in the aeration chamber and preferably in such position, in the case of aeration at least, as to be partly emergent from the liquid. Due to the coarseness of the orifices of the said aerator, stoppages are eliminated; a similarly constructed but non-rotating aerator would not, however, successfully comminute the air. If, however, the said aerator is rotating, I have found that the size of the bubbles produced may be greatly reduced, resulting in a fine comminution of the air passing into the liquid. By so positioning my aerator as to be partly emergent from the body of liquid being aerated, I have found that an increase in efficiency of contact between the gas and liquid is obtained. This additional effect is of great importance, and is probably the result of at least two factors; first, the film of liquid carried over by the emergent portion of the rotating cylinder, and second, the tendency for said rotating cylinder to drag air particles under the surface of the liquid. The said cylinder is preferably constituted of a metallic woven screen, and is of such diameter as to provide a relatively high linear speed of the orifices or openings in said screen, at moderate rates of rotation and low power requirements.

The invention further provides for replacing porous aeration means entirely by said novel mechanical integration means, or a plurality thereof as may be highly desirable in many cases.

With respect to contact between two liquids, the present invention has an important application to processes involving extraction of constituents of one liquid by another, as in the extraction of phenol from still wastes by means of benzol, kerosene, or the like, and more particularly to such process, or processes, as are described and claimed in copending application for Letters Patent of Joseph A. Shaw, Serial No. 112,041, filed May 27, 1926, for improvements in process and apparatus for the treatment of phenol-bearing liquids.

In such usage, the tendency toward stoppages, in porous diffusion means, is relatively greater than in gas and liquid contact. Not only is the actual volume of entrained matter likely to be larger, but the filtering effect is exaggerated, and the diffusion means more difficult to clean. An object of the present invention is to eliminate such stoppages while effecting an exceedingly fine comminution of liquid, and high efficiency of contact.

In the accompanying drawings, forming a part of this specification, and showing for purposes of exemplification, a preferred form and manner in which the invention may be embodied and practiced, but without limiting the claimed invention specifically to such illustrative instance or instances:

Figure 1 is a side elevation of the apparatus for liquid purification of gases constructed in accordance with this invention and embodying in operation an absorption phase and actification phase;

Fig. 2 is a top plan view of the same;

Fig. 3 is an end elevation of the same (the absorber being omitted);

Fig. 4 is a longitudinal vertical section of the mechanical integrator aerator in tubular form;

Fig. 5 is a vertical cross-sectional view taken on the line 5—5 of Fig. 4;

The same characters of reference designate the same parts in each of the several views of the drawings.

Figure 7:
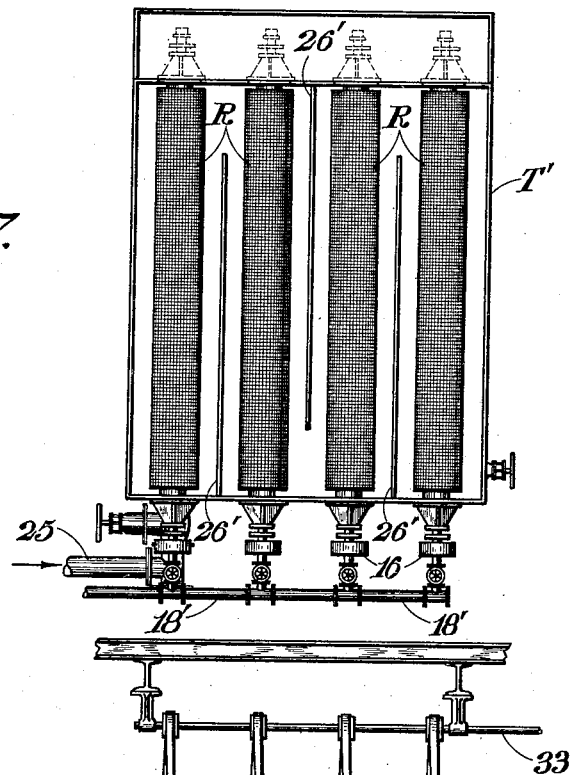
Figs. 6 and 7 are side and top elevational views, respectively, of an alternate form of aeration apparatus, including a plurality of rotary mechanical aerators partly emergent from the liquid and without supplementary aeration means.

With reference to Figs. 4 and 5, the mechanical integrator R comprises a coarse cylindrical screen 10, coaxially situated with respect to a hollow perforated air pipe 13, rotatably mounted at each end in a combined bland and bearing 14, that is secured to the side 15 of the tank T. The said aerator R is rotated by a motor M, connected by a belt 27 to the pulley 16, and is connected on the one end through the gland 17 to a non-rotatable air supply line 18, and sealed on the other end by the pipe cap 19.

The screen 10 may be about four mesh per inch, and the one illustrated in this instance is metallic and is approximately twelve inches in diameter, and rotates at a preferred speed of one hundred and thirty revolutions per minute. This corresponds to a linear orifice speed of approximately six hundred and twenty-eight feet per minute.

The flanges 20 to which the screen is secured by means of the fastenings 21 are rigidly mounted on the perforated air pipe 13, and can be spaced at convenient intervals, depending on the length of the said pipe. The end flanges 20 are preferably spaced so as to fit loosely against the bearings 14, thus limiting the thrust movement of the aerator R. Set screws 31 are provided to maintain the flanges 20 in position.

The diffusing aerators 28 illustrated in Figs. 1, 2 and 3, are of tubular configuration, which is the preferred form, although they may be made in other suitable shapes when this is desirable. They consist of closely woven soft pliable porous fabric (for instance, twill) and are mounted and suspended in the liquid so as to be vibratile under the influence of air flowing therethrough.

For the purpose of further exemplification, the present invention will now be described in connection with a liquid gas purification system.

The gas to be purified enters the absorbing tower A through the inlet pipe 22, and passes upward through the tower, escaping through the outlet pipe 23. During the travel of the gas through the tower A, it comes into intimate contact with the alkaline liquid absorbing agent that is sprayed into the absorber A through the sprays 24. The absorber A is filled with suitable contact means, for instance, the combination of distributive and contact devices described and claimed in my copending application Serial No. 21,980, filed April 9, 1925. The liquid as it flows downward through the absorber comes into intimate and thorough contact with the gas flowing counter thereto and takes up all, or at least substantially all, of the hydrogen sulphide contained in the gas. The spent purifying liquid collects at the bottom of the absorber A, and passes through the sealed outlet line 25, into the tank T, or compartment or a plurality thereof, called the thionizer, which is comprised of sections or passes $T_1$, $T_2$, $T_3$ and $T_4$. Said passes are communicably separated by means of the vertically disposed baffle plates 26.

The pass $T_1$, wherein is situated the rotary aerator R, is provided with the false bottom 49, in such a manner as to provide a relatively shallow body of liquid in the pass $T_1$, and a relatively deep body of liquid in the remaining passes of the thionizer T. The liquid first enters the relatively wide and shallow pass $T_1$, where it comes in contact with the rotating tubular mechanical integrator aerator R, hereinabove described, and subsequently traverses the passes $T_2$, $T_3$ and $T_4$, wherein are disposed a plurality of the tubular vibratile fabric aerators 28 hereinafter described. During the flow of the spent liquid through the thionizer, it is forcibly aerated by means of finely comminuted air introduced by the rotaing mechanical aerator R and is subsequently further forcibly aerated by the plurality of tubular aerators 28 situated therein, and which are supplied with air under pressure from the air line 18.

In order to prevent the emission of a spray into the atmosphere, and to provide for the accumulation of the foam resulting from the action of the mechanical aerator R, the compartment $T_1$ of the thionizer T is preferably much wider than the remaining passes, in which the surface of the liquid is unbroken, and a cover is provided over that portion of the pass $T_1$, which includes the said aerator R. Said cover is comprised of the horizontal top 47 and the vertical partition 48, between the lower portion of which and the level of the liquid within the thionizer T, air is free to pass.

The aerators 28 may be of any suitable form, but the preferred form is the vibratile tubular fabric aerator described and claimed in the above-noted copending application Serial No. 21,978. Such aerators are particularly suitable for oxidizing sulphided gas purifying liquors and are most particularly suitable for oxidizing the last part of the sulphide content of the initially oxidized solution. The sulphur liberated by aeration is free sulphur and it is allowed to rise to the surface, where it accumulates as foam, which is or may be drawn off by means of the foam trough $T_5$, and treated for recovery of the sulphur or other constituents thereof, The revivified solution-suspension passes out of the compartment $T_4$ through the outlet pipe 29 to the pump P, which forces it through the pipe 30 and sprays 24 into the absorber A. The cycle is thus begun once more.

Figure 6:
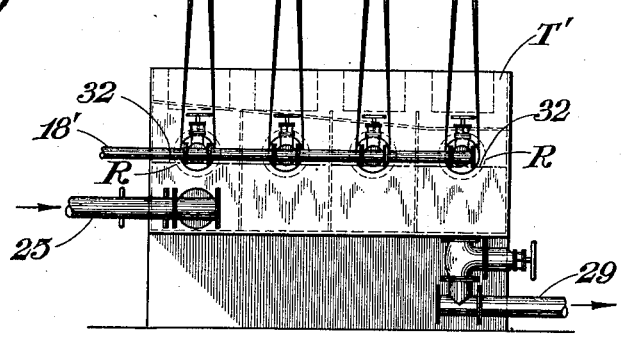

While the combination of mechanical and porous diffusion means I have set forth and described is of particular utility under certain conditions, as, for example, in the aeration of gas purification liquids, my invention is not limited to such embodiment. For example, I may employ a plurality of the rotatable aerators R, without employing other diffusion means. Such an embodiment is shown more particularly in Figs. 6 and 7. In these figures, a plurality of aerators R are horizontally positioned in the tank or thionizer T′, or the various sections thereof, in such relation to the level of the liquid maintained therein, and indicated by the line 32, as to be partly emergent from the body of said liquid. Air is introduced into the rotors R from the header 18′, and the said rotors R are driven from the line shaft 33 by the belts 27′, but other means of inducing rotation may be sitsuted therefor.

By reason of the fact that the present invention provides a large number of coarse orifices where the solution is initially subjected to oxidation, I avoid the tendency toward such occasional stoppages in that part of the aeration system where this effect is noticeable. By moving these orifices with respect to the liquid in the manner described, the same high efficiency of aeration by means of finely comminuated air is obtained as when porous media are used, but without the occasional disadvantages inherent in the use of such porous media alone.

The invention has been described as particularly related to the revivification of spent gas purification liquids, but may be applied to aeration processes where high efficiency without the occasional stoppages is desired.

In the treatment of one liquid with another, I ordinarily prefer to completely submerge the rotary aerators R, and the body of the liquid in the treatment chamber may be relatively deeper.

My invention, as thus variously embodied, has been proved in practice to give high efficiency of contact between two fluids, without being subject to the stoppages that are usually inevitable in the operation of porous fluid contact means.

The invention as hereinabove set forth is embodied in particular forms but may be variously embodied within the scope of the claims hereinafter made.

I claim:

1. Gas and liquid contact apparatus comprising, in combination: actification means having a tank divided by baffles into communicating portions; means for leading liquid to an inlet portion of said actification means; tubular metallic foraminous mechanical integrator means mounted for rotation within such inlet portion and partially submerged within said liquid; means for supplying air within such mechanical integrator means; means for rotating such integrator means; tubular woven fabric air-diffusing means in the other portions of said actification means; means for supplying air to such tubular woven fabric air-diffusing means; and means for leading the aerated liquid from such actification means.

2. Apparatus for regenerating spent absorbent liquid for further use in liquid purification of gases which comprises, in combination: an actification tank; baffles therein dividing the tank into an inlet and adjacent compartments communicably connected in series for flow of liquid; aeration means in each compartment, the aeration means in the inlet compartment being a foraminous tubular mechanical integrator mounted for rotation in said compartment, the aerating means for the remainder of such compartments being woven fabric tubular air diffusers mounted to be vibratile under the action of air flowing thereto; means for supplying spent liquid to said actification tank; means for leading the actified liquid from said tank.

3. Apparatus for actifying fouled solution for gas purification purposes comprising, in combination: an actifier chamber; non-rotable diffusing means in said chamber for diffusing finely comminuted air therein; rotatable means therein for effecting mechanical integration of air and liquid; and means adapted for so supplying liquid to and drawing liquid off from said actifier chamber that the liquid supplied to the chamber traverses the rotatable means first and then the diffusing means.

4. Means for effecting contact between two fluids comprising, in combination: a horizontally disposed rotatable fluid pipe adapted to be immersed in another fluid; tubular foraminous metallic covering therefor partially immersed in said latter fluid, said covering being spaced from said pipe and secured thereon for movement therewith; said fluid pipe being supported at each end by a combined gland and bearing; means for rotating said pipe; and stationary means for supplying fluid to said fluid pipe.

5. Apparatus for regenerating sulphided wash liquor from a gas purification stage comprising, in combination: a regeneration tank; wash liquor inlet means therefor; a rotatable foraminous tubular member adjacent said inlet; a plurality of tubular finely woven porous air diffusing means spaced from said inlet; means for rotating said foraminous member; and means for supplying air to said rotatable foraminous member and to said air diffusing members.

6. Apparatus for regenerating sulphided wash liquor from a gas purification stage comprising, in combination: a regeneration tank; wash liquor inlet means therefor; a rotatable foraminous member adjacent said inlet and mounted in said tank so as to be partially emergent from the liquid during rotation in the tank and a plurality of porous members laterally spaced from said rotatable member; means for rotating said rotatable member; and means for supplying air directly to said rotatable member for delivery thereby to liquid in said tank; means for supplying air directly to said porous members independently of rotatable member for delivery to said liquid separately from the delivery of the rotatable member; and means adapted for so effecting flow of the liquid through said tank that the liquid from the inlet means first traverses the rotatable member and then the porous members.

7. Means for effecting mechanical integration of fluids comprising, in combination: a tank adapted to contain a fluid; a horizontally disposed tubular foraminous member mounted for rotation while partially submerged within said tank; means for supplying another fluid to said member; means for rotating said member in contact with the said fluids; and a plurality of non-rotatably mounted porous diffusing members in said tank.

8. Means for effecting mechanical integration of fluids comprising, in combination: a tank adapted to contain a fluid; a horizontally disposed tubular foraminous member mounted for rotation while partially submerged within said tank; means for supplying another fluid to said member; means for rotating said member in contact with the said fluids; and a plurality of non-rotatably mounted elongated tubular air diffusers providing a multitude of minute pores through which air diffuses, said tubular air diffusers being mounted in said tank so that they are vibratory under the action of air passing therethrough; and means for supplying air to said tubular air diffusers.

9. Apparatus for aeration of liquids comprising, in combination: an aeration tank; porous aerating members therein; a foraminous member mounted for rotation in liquid to be aerated in said tank and disposed therein laterally of the porous aerating members; means for supplying aeration gas directly to each of the porous members and to the foraminous member for separate delivery by the respective members into liquid in said tank; and means adapted for so supplying liquid to and drawing liquid off from said tank that the liquid supplied to the tank traverses the foraminous member first and then the porous members.

10. In apparatus for purifying gases comprising an absorber chamber adapted for removal of impurities from gas by contact with gas washing liquid therein, an actifier tank adapted for revivification by aeration of the gas washing liquid, means for circulating said liquid to and fro between the absorber and the actifier, and aeration gas admitting means adapted for admitting aeration gas to the actifier, the combination of a horizontally disposed tubular foraminous member mounted for rotation about a horizontal axis within said actifier tank and adapted for receiving aeration gas from said aeration gas admitting means at the inside of said tubular member and adapted to deliver such gas through the foraminations of the tubular member into liquid in said actifier tank during rotation therein, means adapted to maintain liquid in said tank at such level that the said tubular member is partially emergent from the top level of the liquid, and means for effecting rotation of said tubular member within said tank.

11. In apparatus for purifying gases comprising an absorber chamber adapted for removal of impurities from gas by contact with a gas washing liquid therein, and an actifier chamber adapted for revivification by aeration of the gas washing liquid, and circulation means for circulating said liquid to and fro between the absorber and actifier, the combination of a horizontally disposed tubular member mounted so as to be partially immersed in the liquid in the actifier chamber for rotation about a substantially horizontal axis therein, means cooperating with the aforesaid circulation means for maintaining the top level of liquid in said actifier chamber at such level that the said tubular member is maintained partially immersed in the liquid during rotation of the tubular member, and means for rotating the tubular member.

In testimony whereof I have hereunto set my hand.

FREDERICK W. SPERR, JR.